(12) United States Patent
Weaver

(10) Patent No.: US 12,273,663 B2
(45) Date of Patent: Apr. 8, 2025

(54) PRECONFIGURED WEATHER-RESISTANT ENCLOSURE ASSEMBLY FOR TERMINATING TELECOMMUNICATIONS EQUIPMENT

(71) Applicant: Charles E Weaver, Lakeland, FL (US)

(72) Inventor: Charles E Weaver, Lakeland, FL (US)

( * ) Notice: Subject to any disclaimer, the term of this patent is extended or adjusted under 35 U.S.C. 154(b) by 105 days.

(21) Appl. No.: 17/930,208

(22) Filed: Sep. 7, 2022

(65) Prior Publication Data

US 2024/0080593 A1    Mar. 7, 2024

(51) Int. Cl.
| | |
|---|---|
| *H02B 1/20* | (2006.01) |
| *H02B 5/00* | (2006.01) |
| *H02S 20/20* | (2014.01) |
| *H04Q 1/02* | (2006.01) |

(52) U.S. Cl.
CPC .............. *H04Q 1/114* (2013.01); *H02B 1/20* (2013.01); *H02B 5/00* (2013.01); *H02S 20/20* (2014.12); *H04Q 1/03* (2013.01); *H04Q 1/035* (2013.01); *H04Q 1/09* (2013.01)

(58) Field of Classification Search
None
See application file for complete search history.

(56) References Cited

U.S. PATENT DOCUMENTS

| | | |
|---|---|---|
| 4,644,095 A | 2/1987 | Bright et al. |
| 4,901,202 A | 2/1990 | Leschinger |
| 5,136,463 A | 8/1992 | Webster |

(Continued)

FOREIGN PATENT DOCUMENTS

| | | |
|---|---|---|
| WO | 2018023155 | 2/2018 |
| WO | 2021063583 | 4/2021 |

(Continued)

OTHER PUBLICATIONS

APX Enclosures, Inc., "Telecom Cabinets", https://www.apxenclosures.com/customization-options, pp. 1-5.

(Continued)

*Primary Examiner* — Courtney L Smith
(74) *Attorney, Agent, or Firm* — Jon Gibbons; Fleit Intellectual Property Law

(57) ABSTRACT

A preconfigured weather-resistant enclosure assembly for terminating telecommunication equipment that includes at least one access panel for gaining access to an interior portion, the interior portion of the weather-resistant enclosure including a backboard portion for mounting telecommunication equipment, and at least one internal bus bar to provide electrical ground. A set of one or more solar panels mechanically coupled to the weather-resistant enclosure. The solar panels are typically mechanically coupled to the top side of the weather-resistant enclosure. A renewable energy power management system that includes one or more outputs that provide at least one of 100VAC-120VAC power, 220VAC-240VAC, 24VDC-48VDC, or a combination thereof, the renewable energy power management system is positioned inside the interior portion of the weather-resistant enclosure, the renewable energy power management system includes one or more inputs electrically coupled to the set of one or more solar panels.

20 Claims, 9 Drawing Sheets

(56) References Cited

U.S. PATENT DOCUMENTS

| | | | |
|---|---|---|---|
| 5,678,378 A * | 10/1997 | Ellison, Jr. | ............... E04C 5/06 |
| | | | 52/320 |
| 5,886,296 A | 3/1999 | Ghorbani et al. | |
| 6,303,854 B1 | 10/2001 | Papalco et al. | |
| 6,310,772 B1 | 10/2001 | Hutchinson et al. | |
| 6,332,659 B1 | 12/2001 | Cook et al. | |
| 6,510,226 B1 | 1/2003 | Thomann et al. | |
| 6,732,787 B1 | 5/2004 | Trehan et al. | |
| 8,403,431 B2 | 3/2013 | Elkins et al. | |
| 8,716,889 B2 * | 5/2014 | Vaidyanathan | ......... H02S 10/40 |
| | | | 307/43 |
| 9,462,707 B2 | 10/2016 | Wright et al. | |
| 9,882,362 B2 | 1/2018 | Carapella et al. | |
| 10,366,087 B2 | 7/2019 | Harris et al. | |
| 10,666,185 B2 * | 5/2020 | Aikens | ................... H02S 10/40 |
| 11,283,397 B2 * | 3/2022 | Kunesh | ................ F24S 30/452 |
| 2005/0135068 A1 | 6/2005 | Huff | |
| 2005/0207125 A1 | 9/2005 | Huscher | |
| 2005/0275319 A1 | 12/2005 | Wittmeier et al. | |
| 2008/0019299 A1 | 1/2008 | Lekutai et al. | |
| 2008/0055849 A1 | 3/2008 | Lee | |
| 2009/0319189 A1 | 12/2009 | Cornett et al. | |
| 2015/0300321 A1 * | 10/2015 | Haar | ...................... F03D 9/255 |
| | | | 206/223 |
| 2020/0329577 A1 | 10/2020 | Hermann | |
| 2022/0216825 A1 * | 7/2022 | Kunesh | ................... H02S 30/20 |

FOREIGN PATENT DOCUMENTS

| | | |
|---|---|---|
| WO | 2021155182 | 8/2021 |
| WO | 0237919 | 5/2022 |

OTHER PUBLICATIONS

AT&T, "AT&T Virtual Private Network and AT&T Nirtual Private Network Express", Dec. 2018, pp. 1-10.

BETE Telecom Cabinet Solution Provider, info@bttelecomcabinet. com, pp. 1-9.

Bluetti, Bluetti EP 500 Solar Power Station, Amazon.com.

Bluetti, Bluetti EP 500 Solar Power Station, User Manual, pp. 1-44.

Tianjin Estel Electronic Science and Technology Co., Ltd., Outdoor Telecom Enclosure, Network Cabinet, IP55, with Batter and Equipment Compartment., pp. 1-3.

Graybar Catalog order, for CSD483616, Wall mount type, http://www.graybar.com.

JA Solar, 410 W MBB Half-Cell Module JAM72S10 400-420-MR, https://www.jasolar.com.

W-TEL Solar Power Telecom Equipment IP66 Protection Outdoor Electrical Cabinet with Competitive Price, pp. 1-16.

\* cited by examiner

PRECONFIGURED WEATHER-RESISTANT ENCLOSURE ASSEMBLY FOR TERMINATING TELECOMMUNICATIONS EQUIPMENT

FIELD OF THE DISCLOSURE

The present disclosure generally relates to telecommunication equipment, especially local exchange carrier equipment (LEC), in new developments without previous telecommunications equipment installed.

BACKGROUND

Developing a new building, a new structure, or development over a piece of land that has never been developed is often referred to as "greenfield development." Part of this development is getting a telecommunication company or local exchange carrier (LEC) to install their network equipment. This is particularly important for newer telecommunications technologies, including fiber optics, and broadband cellular and wireless networks such as 5G and beyond are deployed.

Network equipment, such as LEC equipment, is often installed in outdoor enclosures, also known as control houses. FIG. 1 is a picture of a prior art weather-resistant control house 100 with the two doors 102, 104 open, illustrating telecommunications equipment 106 mounted inside. The telecommunications equipment is terminated in outdoor enclosures that properly withstand the environmental elements. The environmental elements include large ambient temperature ranges, moisture, ice, shock hazards, and UV damage. In addition, network hardware generates excess heat. A temperature control solution that manages airflow with heating/cooling technology may be needed to maintain the required operating temperature ranges of the network equipment. Further, these outdoor enclosures must often meet local code ordinances and frequently include a protected barrier such as fending to safeguard the equipment against animals and vandalism.

Getting permanent power to a control house is often the longest part of ensuring the telecommunication companies have a place to power their network equipment. During their site inspection process, if a telecommunications company observes a portable power solution, they will not consider the site as permanent and will mark the site as the customer not ready (CNR). The use of portable power generators or solar panels on wheels is considered temporary and not permanent power. Moreover, generators require refueling and fuel storage.

Typically, the telecommunications company installing network equipment requires a set of minimum requirements to be met at the site before ordering the installation of their network equipment. For example, the telecommunications company AT&T has three requirements. These three requirements are adequate backboard for mounting network hardware,
proper grounding, such as an internal busbar, that will be connected to the same ground circuit of the local electrical grid, and
adequate permanent power.

Without these three requirements, the order would be placed into a Customer Not Ready (CNR) status. This stops the network equipment installation process until these requirements are met.

Typically, the control house is delivered 60 days before Commercial Operation Delivery (COD). However, the COD rights could be lost without permanent electrical power for the network equipment, resulting in revenue loss and possible fines for incomplete service.

SUMMARY OF THE INVENTION

A preconfigured weather-resistant enclosure assembly for terminating telecommunication equipment. The preconfigured weather-resistant enclosure includes a weather-resistant enclosure with at least one access panel for gaining access to an interior portion, the interior portion of the weather-resistant enclosure including a backboard portion for mounting telecommunication equipment, and at least one internal bus bar to provide electrical ground. A set of one or more solar panels mechanically coupled to the weather-resistant enclosure. The solar panels are typically mechanically coupled to the top side of the weather-resistant enclosure. A renewable energy power management system that includes one or more outputs that provide at least one of 110VAC-120VAC power. 220VAC-240VAC, 24VDC-48VDC, or a combination thereof, the renewable energy power management system is positioned inside the interior portion of the weather-resistant enclosure, the renewable energy power management system includes one or more inputs electrically coupled to the set of one or more solar panels. The renewable energy power management system typically the renewable energy power management system includes one or more 24VDC-145VDC inputs.

The weather-resistant enclosure typically includes at least one of a cooling fan, an air conditioning unit, a heating-ventilation and air conditioning (HVAC) unit, or a combination thereof. Also, the weather-resistant enclosure may include a 19-inch rack for mounting electronic equipment modules, including electronic equipment modules for convening power generated from the set of one or more solar panels to charge the renewable energy power management system.

In another example, the weather-resistant includes an electrical connection to an electric power grid and an electricity meter mechanically coupled to an outside wall of the preconfigured weather-resistant enclosure assembly to measure the amount of electrical energy consumed by electrical components inside the preconfigured weather-resistant enclosure assembly.

In still another example, the preconfigured weather-resistant enclosure includes a concrete slab, and the weather-resistant enclosure is mechanically coupled to the concrete slab. A bottom side. i.e., side not coupled to the weather-resistant enclosure, may be further configured with a set of parallel channels formed to accept a set of forklift forks to move the preconfigured weather-resistant enclosure assembly. In yet another example, the concrete slab includes one or more electrical conduit openings aligned to provide a continuous electrical conduit opening with one or more openings in the bottom portion of the weather-resistant enclosure. The size of the concrete base is selected to be shipped on a truck. Typically sizes include a concrete slab is between 3 inches and 8 inches in thickness, between 4 feet to 10 feet in length, and between 2 feet to 6 feet in width.

BRIEF DESCRIPTION OF THE DRAWINGS

The accompanying figures, in which like reference numerals refer to identical or functionally similar elements throughout the separate views, and which, together with the detailed description below, are incorporated in and form part of the specification, serve to further illustrate various embodiments and to explain various principles and advantages all in accordance with the present disclosure, in which.

DETAILED DESCRIPTION

Figure 1:
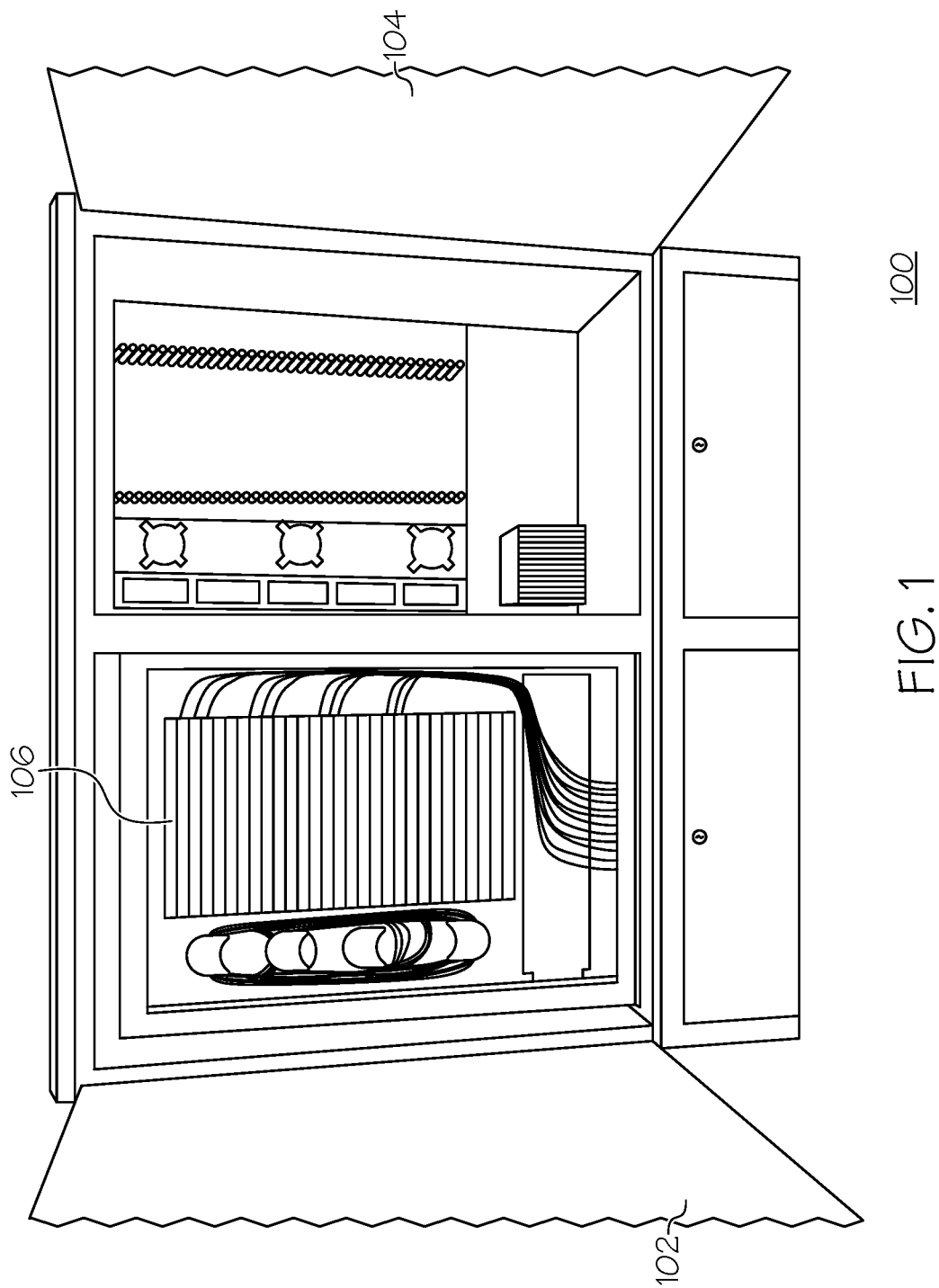
FIG. 1 is a picture of a prior art control house with the doors open, illustrating telecommunications equipment mounted inside, in accordance with the prior art.

As required, detailed embodiments are disclosed herein; however, it is to be understood that the disclosed embodiments are merely examples to show the utility of the transporter. Therefore, specific structural and functional details disclosed herein are not to be interpreted as limiting but merely as a basis for the claims and as a representative basis for teaching one skilled in the art to variously employ the present subject matter in virtually any appropriately detailed structure and function. Further, the terms and phrases used herein are not intended to be limiting but rather to provide an understandable description of the concepts.

Non-Limiting Definitions

The terms "a", "an" and "the" are intended to include the plural forms as well unless the context clearly indicates otherwise.

The phrases "at least one of <A>, <B> . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including anyone element alone or in combination with one or more of the other elements which may also include, in combination, additional elements not listed.

The terms "comprises" and/or "comprising", when used in this specification, specify the presence of stated features, steps, operations, elements, and/or components but do not preclude the presence or addition of one or more other features, integers, steps, operations, elements, components, and/or groups thereof.

The term "Commercial Operation Delivery (COD)" means the date of charging the project or part thereof to its rated voltage level or, alternatively, the ability to generate revenue based on the agreed-upon megawatts rating of the project.

The term "configured to" describes the hardware, software, or a combination of hardware and software that is adapted to, set up, arranged, built, composed, constructed, designed, or that has any combination of these characteristics to carry out a given function. The term "adapted to" describes the hardware, software, or a combination of hardware and software that is capable of, able to accommodate, to make, or that is suitable to carry out a given function.

The term "coupled", as used herein, is defined as "connected," although not necessarily directly and not necessarily mechanically.

The terms "including" and "having," as used herein, are defined as comprising (i.e., open language).

The terms "prefabricated" and "preconfigured," as used interchangeably herein, mean the weather-resistant enclosure has been customized and arranged before being shipped to a location to meet the specific needs of the location or customer.

The term "weather-resistant enclosure", as used herein, is an enclosure with at least one access door capable of protecting the ingress of foreign objects and water. Enclosures with NEMA ratings of 4, 4X, 6, 6P are found to meet this requirement.

Overview

The present invention is a preconfigured weather-resistant enclosure assembly or control house for terminating telecommunications equipment. The present invention is designed to meet the requirements for Commercial Operation Delivery (COD). The requirements include
  adequate backboard for mounting network hardware,
  proper grounding, such as an internal busbar that will be connected to the same ground circuit of the local electrical grid, and
  adequate permanent power.

The present invention maintains COD rights and thereby avoids potential lost revenue and tines.

The present invention solves the problem of having a control house ready for the telecommunication company to install network equipment. The present invention is preconfigured off-site and delivered via truck assembled and ready to operate. Telecommunication companies can quickly review the installation and see that their network equipment can be scheduled for installation.

With a permanent solar array attached and power to actual receptacles in the cabinet, the solution is considered a permanent power solution.

More specifically, using the two solar panels, such as 400-watt panel and 9 Amps, provides enough generation to supply 5100 watt-hours of power to source a 100-watt draw. The renewable energy power management system is electrically coupled to the solar panel. This solution provides enough stored power to supply the needs of the network equipment for 72 hours without consideration of regeneration efforts.

Further, the preconfigured weather-resistant enclosure assembly is designed to take electric grid power when available. This preconfigured weather-resistant enclosure assembly provides a backup solution to permanent electric grid power. The present invention keeps the network circuit up in the event of an electrical grid outage. State differently, this solution resolves two problems. The first problem solved is being able to install network equipment in a control house ahead of Commercial Operation Delivery (COD). The second problem solved is to provide a backup in the event of power failure at the control house.

Preconfigured Weather-Resistant Enclosure

Figure 2:
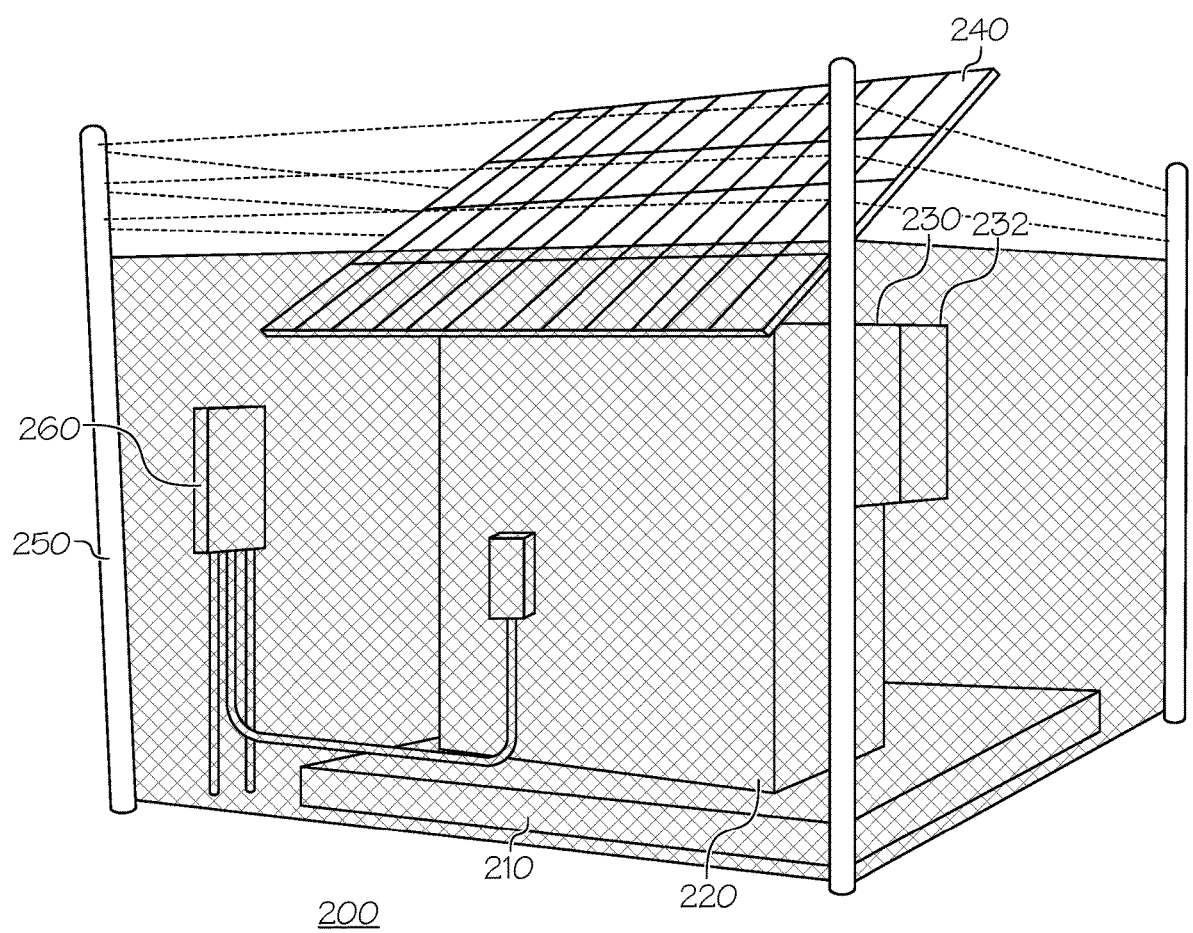
FIG. 2 is an example of the preconfigured weather-resistant enclosure assembly or control house for terminating telecommunications equipment, in accordance with one aspect of the invention.

FIG. 2 is an example of the preconfigured weather-resistant enclosure assembly 200 or control house for terminating telecommunications equipment. Starting from the top, shown is a set of solar panels 240 securely fastened to the top side of a weather-resistant enclosure 220, such as a NEMA 4 box. It is important to note that the present invention is not limited to the specific solar panel and enclosure products and that other products may be substituted including products that use access panels rather than doors.

The weather-resistant enclosure is securely fastened to a concrete slab 210. The solar panels 240 and control house 220 are preconfigured and preassembled off-site and delivered as a read-to-install package. In one example, the tilt of the solar panel may be preconfigured based on the latitude and longitude of the site's geographic location. In another example, a solar panel may be installed on the site. Further, the concrete slab 210 is part of the preconfigured weather-resistant enclosure assembly 200 and shipped with the control house 220 securely fastened to it.

The control house is shown enclosed by a chain-link safety fence 250. The electric meter 260, in this example, is located outside the safety fencing 250. The electric meter measures the power consumed by electrical components inside the weather-resistant enclosure when connected to the electric power grid.

A pair of climate control systems 230, 232, such as a cooling fan, an air conditioning unit, a heating-ventilation and air conditioning (HVAC) unit, or a combination thereof, are shown mounted to the side.

Fork Lift Classes

Figure 3:
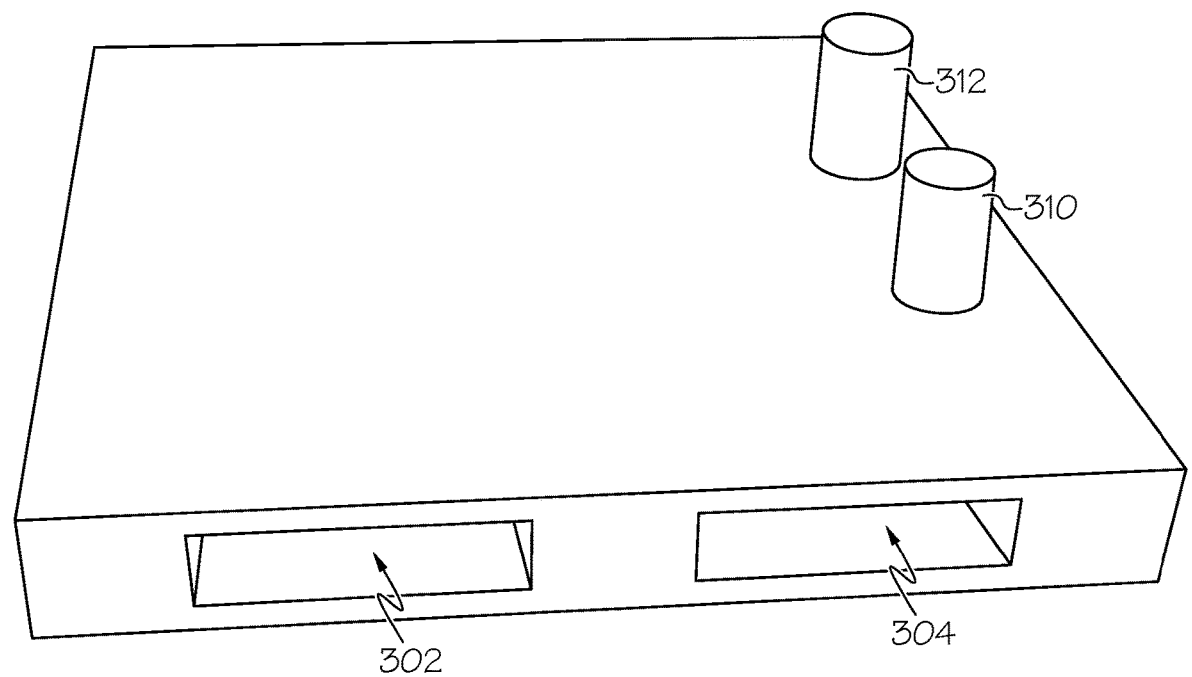
FIG. 3 is a detailed perspective view of a concrete slab of FIG. 2 with forklift openings and electrical conduit stubs, in accordance with one aspect of the invention.

Turning FIG. 3 is a detailed perspective view 300 of a concrete slab of FIG. 2. A pair of forklift channels 302 and 304 are shown in the concrete slab 300. The pair of parallel channels accept a set of forklift forks to enable easy movement of the preconfigured weather-resistant enclosure.

Class 2=16" Carriage Height (1500-5500 lbs. capacity)
Class 3=20" Carriage Height (6000-11,000 lbs. capacity)
Class 4=25" Carriage Height (11,500-17,500 lbs. capacity)

Fork Length—The most common fork length is 42-inches for both Class IT and Class III carriages. This size allows for a standard 48-inch length pallet to be adequately supported without the fork tips protruding and possibly damaging whatever is behind the skid.

Fork Width—Fork width is commonly 4-inches for Class II, 5-inches for Class ill, and 6-inches for Class IV. This keeps them within their capacity limits for their classes. Of course, some people will need narrower forks or wider forks, depending on the application. Often wide forks are desired to spread a load more evenly.

Conduit Stubs

Also shown in the concrete slab 300 are two electrical conduit openings 310, 312, such as 3-inch circular openings that align to provide a contiguous electrical conduit opening with openings in the bottom portion of the weather-resistant enclosure 220.

Although the concrete slab 300 is shown as rectangular, it is important to note that other dimensions of the slab, the size and position of the forklift opening and the size and location of electrical conduit openings 310, 312 can be modified, and other sizes and locations are within the true scope of the present invention. Typically, the largest side dimension of the concrete slab 300 is selected to fit easily on a regular flatbed tractor-trailer.

In another example, the concrete slab is shipped separately or fabricated on-site.

Interior View of Weather-Resistant Enclosure

Figure 4:
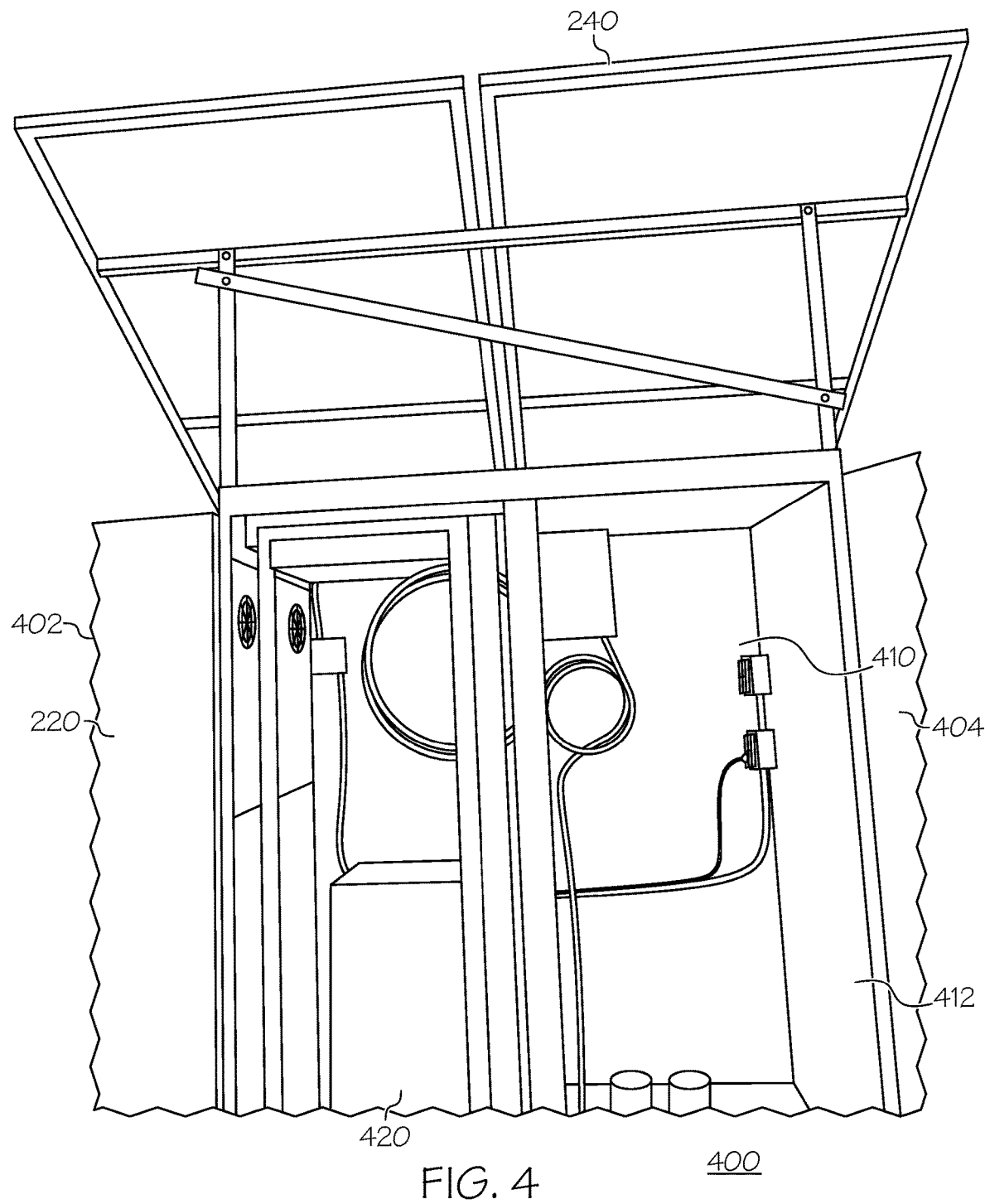
FIG. 4 is an interior view of the preconfigured control house of FIG. 2, in accordance with one aspect of the invention.

FIG. 4 is an interior view 400 of the preconfigured control house of FIG. 2 with the two doors 402, 404 in the opened position. Shown is a back panel or rear wooden interior wall 410 and side wall 412 that act as a backboard for mounting telecommunications equipment. Also shown is a 19-inch rack 420 for securely mounting electronic equipment modules, including electronic equipment modules for converting power generated from the set of one or more solar panels to charge the renewable energy power management system 420.

Renewable Energy Power Management System

Figure 5:
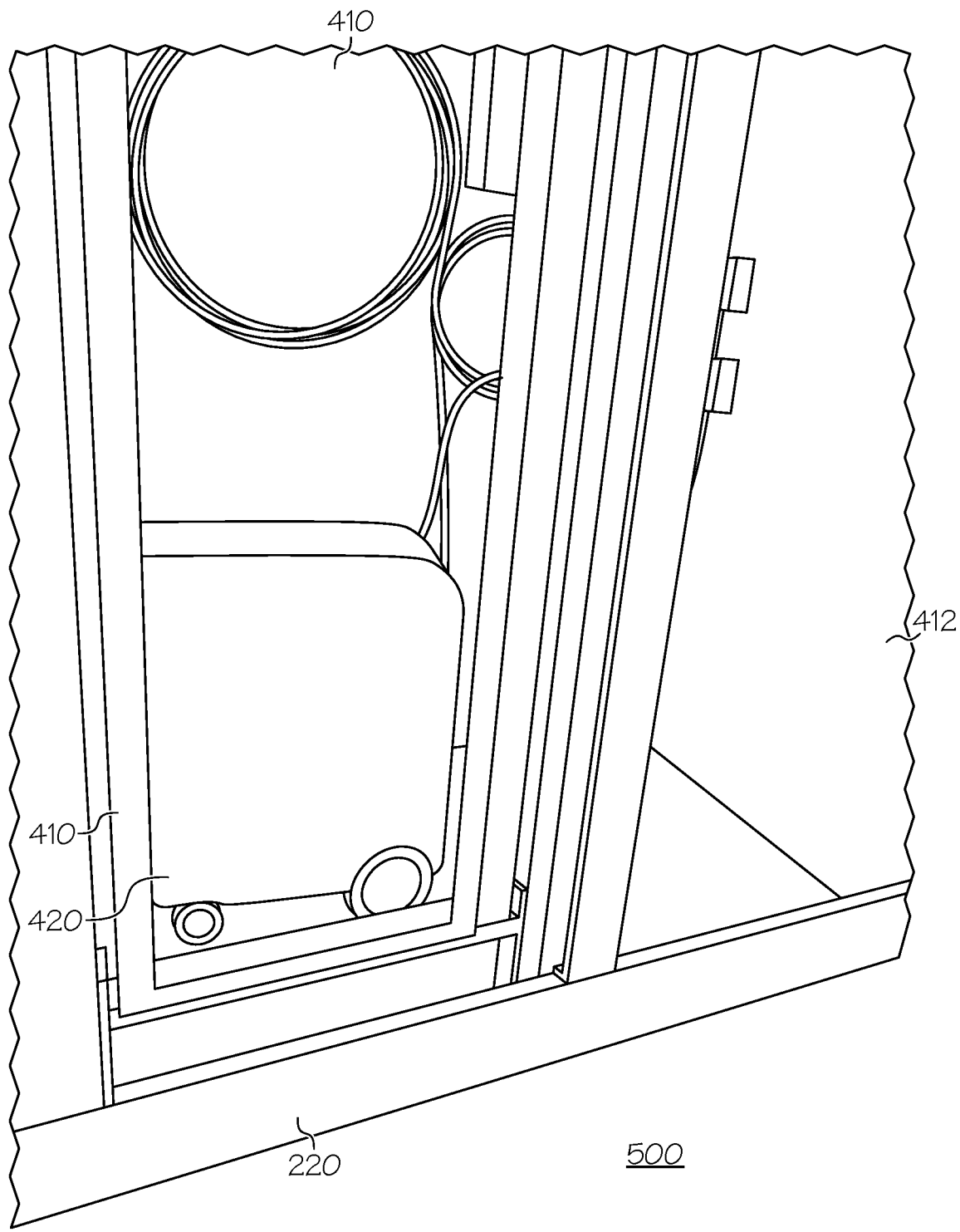
FIG. 5 is another interior view of the preconfigured control house of FIG. 2, illustrating the renewable energy power management system that includes one or more outputs in accordance with one aspect of the invention.

FIG. 5 is another interior view 500 of the preconfigured control house of FIG. 2, illustrating the renewable energy power management system 420 that includes one or more outputs that provide at least one of i) 100VAC-120VAC power, ii) 220VAC-240VAC, or iii) both. One example of a renewable energy power management system is a solar generator that is capable of being powered by solar panels. The renewable energy power management system is positioned inside the interior portion of the weather-resistant enclosure. The renewable energy power management system includes one or more inputs electrically coupled to the set of one or more solar panels.

Electrical Conduit Stubs Inside Weather-Resistant Enclosure

Figure 6:
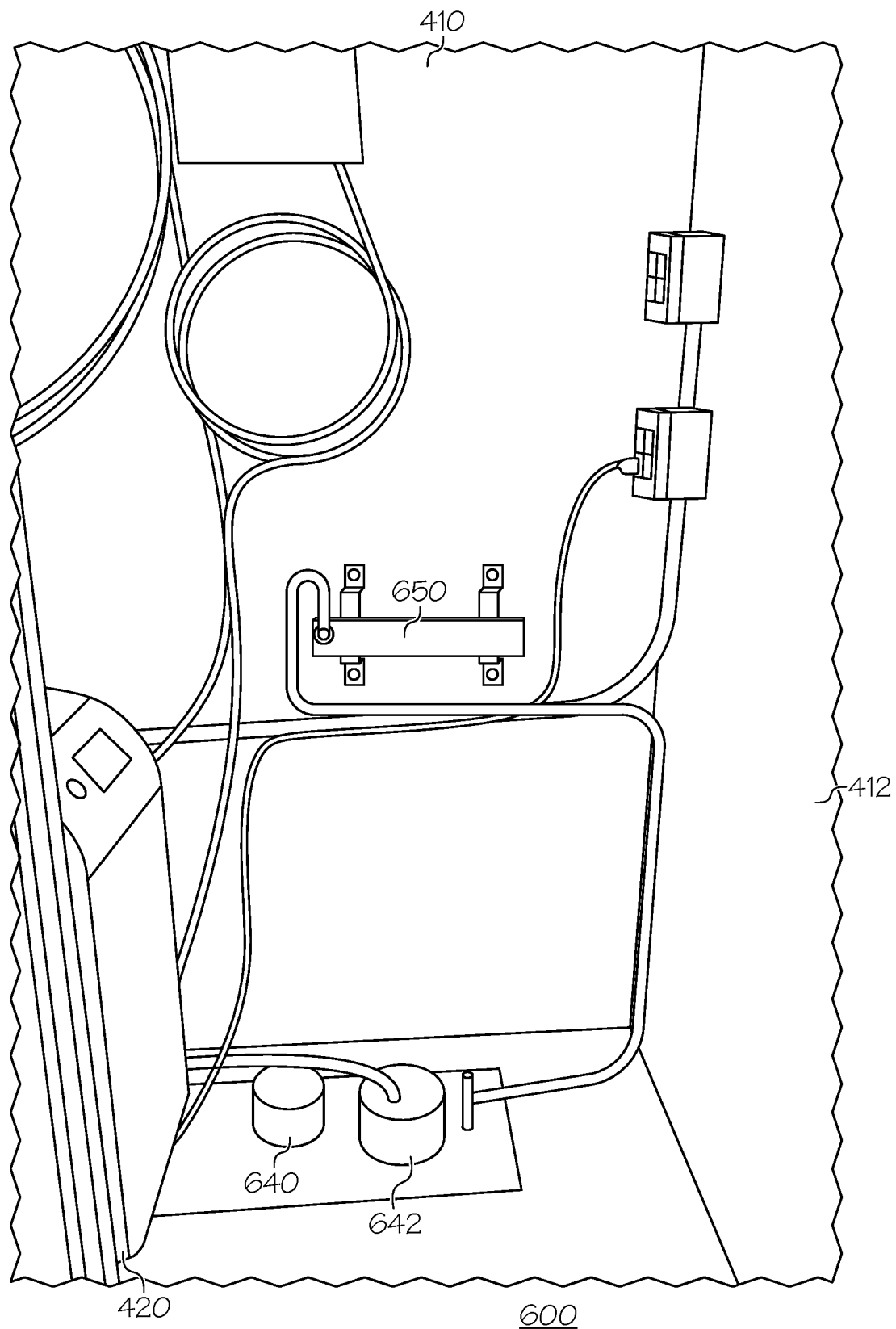
FIG. 6 is another interior view showing the floor of the preconfigured control house of FIG. 2, in accordance with one aspect of the invention.

FIG. 6 is another interior view showing the floor of the preconfigured control house of FIG. 2. A busbar 650 is shown as a common ground termination point. The electrical conduit stubs 640, 642 are shown for wire and cables coming up through the floor. The electrical conduit stubs are coupled to other pipes buried underneath the preconfigured weather-resistant enclosure assembly 200. These electrical conduits are used to route feeder wires that connect to the local power grid.

Climate Control

Figure 7:
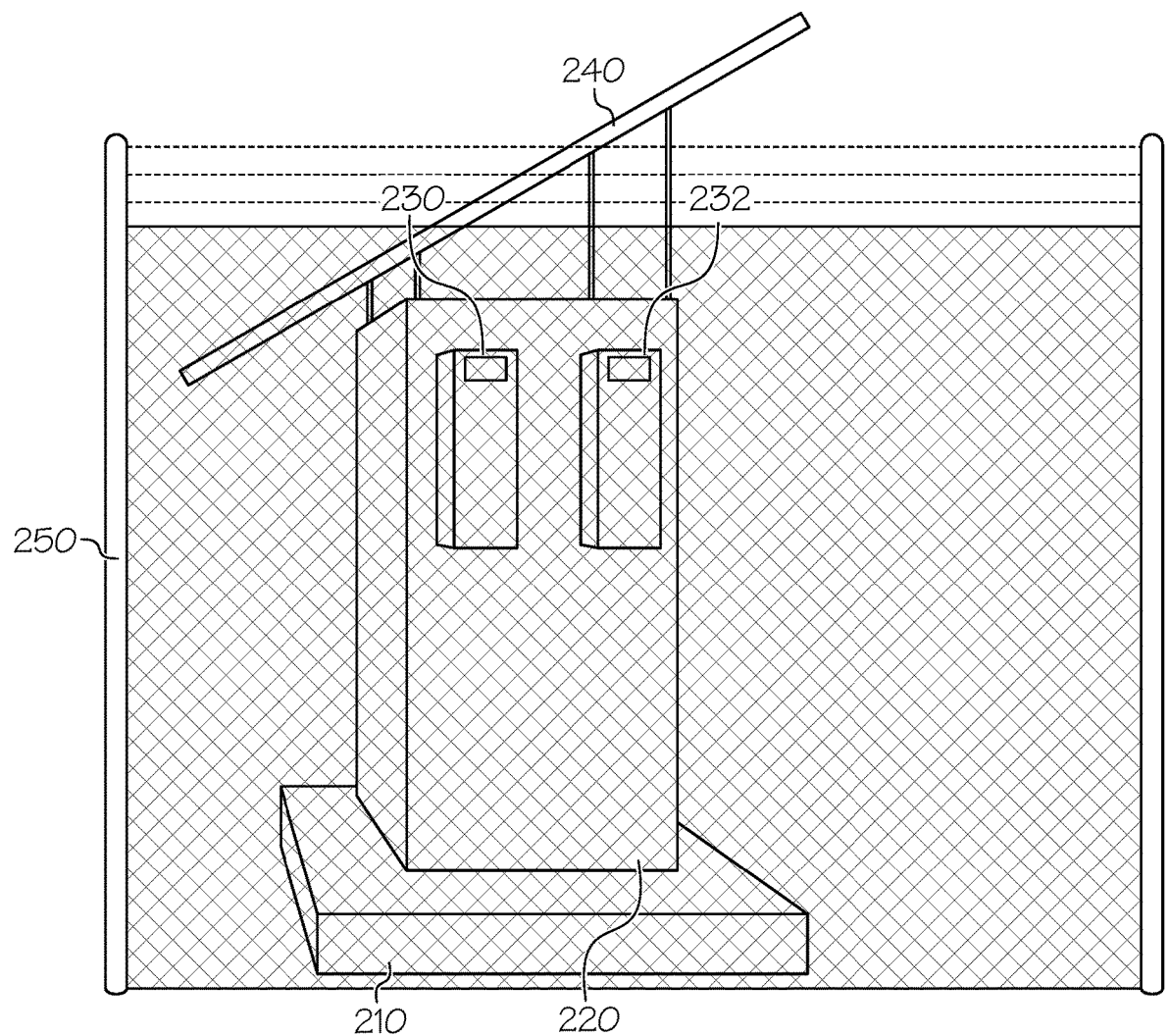
FIG. 7 is another exterior view of FIG. 2, showing two HVAC units mounted on the front-facing wall. Also shown is a side view of the set of solar panels, in accordance with one aspect of the invention.

FIG. 7 is another exterior view of FIG. 2, showing two HVAC units mounted on the front-facing wall. Also shown is a side view of the set of solar panels.

Installation Method

Figure 8:
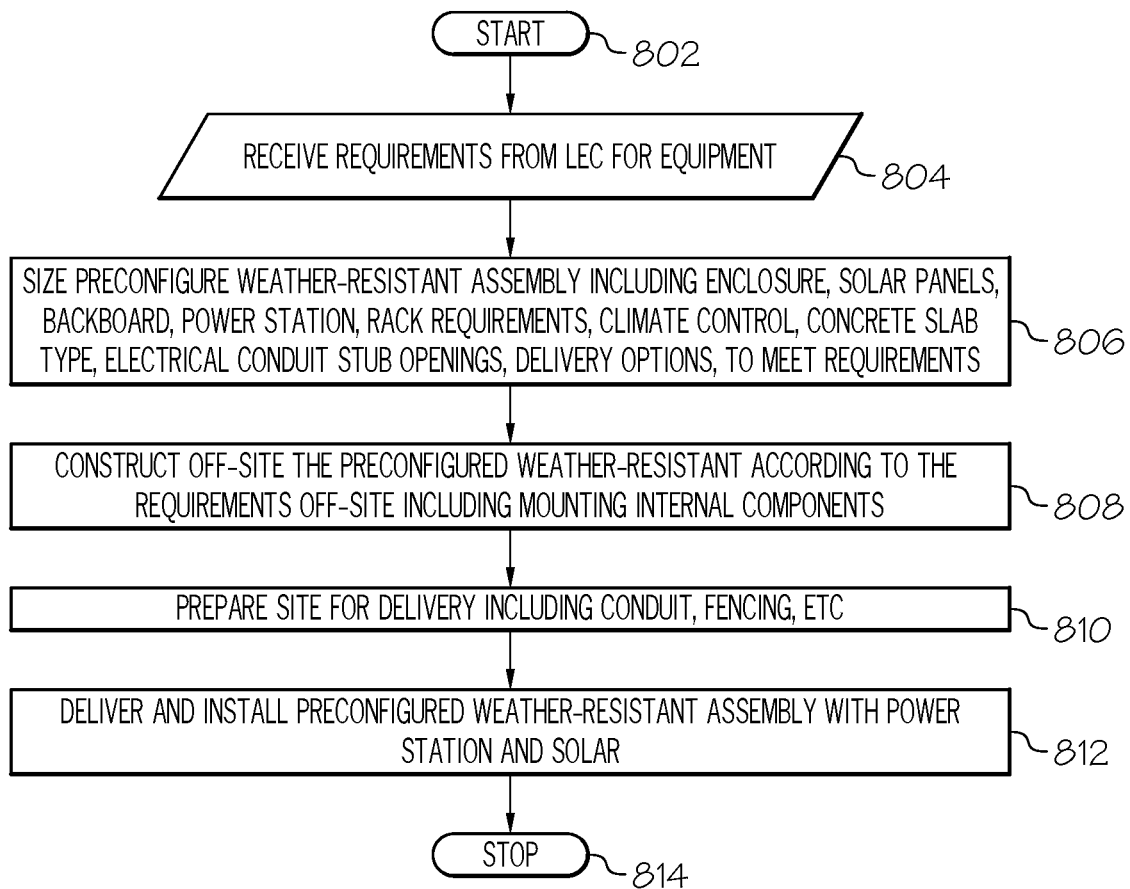
FIG. 8 is a flow diagram illustrating the major steps for ordering, creating, and installing the preconfigured weather-resistant enclosure assembly of FIG. 2 through FIG. 7, in accordance with one aspect of the invention.

FIG. 8 is a flow diagram 800 illustrating the major steps for ordering, creating, and installing the preconfigured weather-resistant enclosure assembly of FIG. 2 through FIG. 7, in accordance with one aspect of the invention. The process begins in step 802 and immediately proceeds to step 804.

In step 804, the requirements are gathered from the local exchange carrier to install network equipment. The requirements include geographic location, the requested date, and power requirements. The process continues to step 806.

In step 806, the size and components of the preconfigured weather-resistant assembly are determined based on the requirements received in step 804. These components include the physical size of the enclosure, solar panels needed, the backboard space requirement for mounting equipment, the capacity of the renewable energy power management system, rack requirements, climate control, concrete slab type, electrical conduit stub openings, and delivery options needed to meet the requirements. The process continued to step 808.

In step 808, the components specified in step 806 are assembled off-site to create the preconfigured weather-resistant assembly. The process continues to step 810.

In step 810, the site is prepared to receive the preconfigured weather-resistant assembly. Preparation may include installing underground conduit, fencing, and clearing vegetation. The process continues to step 812.

In step 812, the preconfigured weather-resistant assembly is delivered to the site via truck. Once in place, in a matter of hours, the site will be functional enough to meet the requirements of the LOC. The process ends in step 814.

Powering a Remote Network Component

Figure 9:
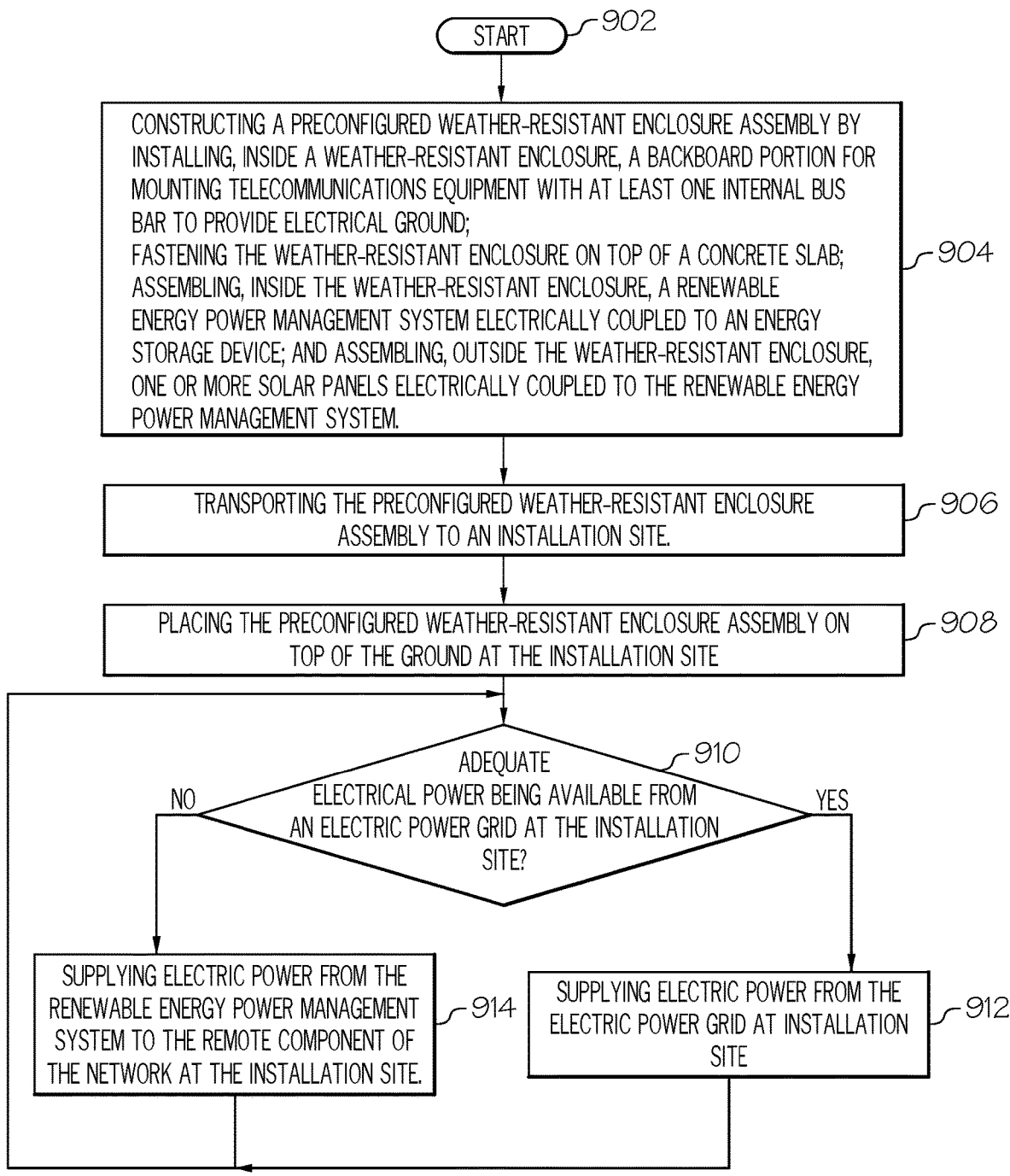
FIG. 9 is a flow diagram illustrating the major steps for placing and powering of a remote network component of FIG. 2 through FIG. 7, in accordance with one aspect of the invention.

FIG. 9 is a flow diagram illustrating the major steps for placing and powering of a remote network component of FIG. 2 through FIG. 7, in accordance with one aspect of the invention. The process begins in step 902 and immediately proceeds to step 904.

In step 904, a preconfigured weather-resistant enclosure assembly is constructed by (i) installing, inside a weather-resistant enclosure, a backboard portion for mounting telecommunications equipment with at least one internal bus bar to provide electrical ground; (ii) fastening the weather-resistant enclosure on top of a concrete slab; (iii) assembling, inside the weather-resistant enclosure, a renewable energy power management system electrically coupled to an energy storage device; and (iv) assembling, outside the weather-resistant enclosure, solar panels electrically coupled to the renewable energy power management system.

In one example, the weather-resistant enclosure is fastened on the top side of the concrete slab, and the bottom side of the concrete slab includes at least one set of parallel channels formed to accept a set of forklift forks to move the preconfigured weather-resistant enclosure assembly.

In another example, the angle of the solar panels is adjusted based on the geographic location of the installation site.

In yet another example, the renewable energy power management system further includes one or more outputs that provide at least one of 100VAC-120VAC power, 220VAC-240VAC, 24VDC-48VDC, or a combination thereof.

In still another example, at least one a cooling fan, an air conditioning unit, a heating-ventilation and air conditioning (HVAC) unit, or a combination thereof is installed during the construction of the preconfigured weather-resistant enclosure.

In still another example, construction the preconfigured weather-resistant enclosure assembly further includes fastening the weather-resistant enclosure on top of the concrete slab with one or more electrical conduit openings aligned to provide a contiguous electrical conduit opening with one or more openings in a bottom portion of the weather-resistant enclosure. The process proceeds to step 906.

In step 906, the preconfigured weather-resistant enclosure assembly is transported to an installation site. The transportation may include a vehicle, such as a truck, with a forklift. In this example, transporting the preconfigured weather-resistant enclosure assembly to an installation site includes using a forklift to place the preconfigured weather-resistant enclosure assembly onto the vehicle. The process continues to step 908.

In step 908, the preconfigured weather-resistant enclosure assembly is placed on top of the ground at the installation site. In one example, a forklift is used to place the preconfigured weather-resistant enclosure assembly onto the ground at the installation site. The process continues to step 910.

In step 910, a test is made. Specifically, the test made whether adequate electric power is available from an electric power grid at the installation site. If there is adequate electric grid power, the renewable energy power management system switches from supplying electric power from the solar panels to the remote component of the network to supplying electric power from the electric grid to the remote component of the network. Otherwise, if there is not adequate electric power, the electric power is supplied from the renewable energy power management system to the remote component of the network at the installation site. The remote component of the network can be powered for a year time frame or more before electric grid power is available. The process loops back up to step 910, as shown.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A preconfigured weather-resistant enclosure assembly for terminating telecommunication equipment comprising:
    a weather-resistant enclosure with at least one access panel for gaining access to an interior portion, the interior portion of the weather-resistant enclosure including a backboard portion for mounting telecommunication equipment and at least one internal bus bar to provide an electrical ground;
    a set of one or more solar panels mechanically coupled to the weather-resistant enclosure;
    a renewable energy power management system that includes at least one of an AC output, a DC output, or a combination thereof, wherein the renewable energy power management system is positioned inside the interior portion of the weather-resistant enclosure, and wherein the renewable energy power management system includes one or more DC inputs electrically coupled to the set of one or more solar panels;
    a concrete slab with a bottom side and a top side, the weather-resistant enclosure is mechanically coupled to the top side of the concrete slab, and the bottom side of the concrete slab includes at least one set of parallel rectangular channels formed to accept a set of forklift forks to move the preconfigured weather-resistant enclosure assembly; and
    one or more electrical conduit openings disposed perpendicular to the top side of the concrete slab and through to the bottom side of the concrete slab, the one or more electrical conduit openings disposed between a side of the concrete slab and a longest side of one of the parallel rectangular channels.

2. A preconfigured weather-resistant enclosure assembly for terminating telecommunication equipment comprising:

a weather-resistant enclosure with at least one access panel for gaining access to an interior portion, the interior portion of the weather-resistant enclosure including a backboard portion for mounting telecommunication equipment and at least one internal bus bar to provide electrical ground;

a set of one or more solar panels mechanically coupled to the weather-resistant enclosure;

a renewable energy power management system that includes at least one of an AC output, a DC output, or a combination thereof, and the renewable energy power management system receiving one or more DC inputs the renewable energy power management system is positioned inside the interior portion of the weather-resistant enclosure, and the one or more DC inputs electrically coupled to the set of one or more solar panels; and a concrete slab, and the weather-resistant enclosure is mechanically coupled to the concrete slab, wherein the concrete slab includes one or more electrical conduit openings aligned to provide a contiguous electrical conduit opening with one or more openings in a bottom portion of the weather-resistant enclosure.

3. The preconfigured weather-resistant enclosure assembly of claim 2, wherein the concrete slab is between 3 inches and 8 inches in thickness, between 4 feet to 10 feet in length, and between 2 feet to 6 feet in width.

4. The preconfigured weather-resistant enclosure assembly of claim 2, wherein the weather-resistant enclosure includes a top side, and the set of one or more solar panels are mechanically coupled to the top side of the weather-resistant enclosure.

5. The preconfigured weather-resistant enclosure assembly of claim 2, wherein the weather-resistant enclosure includes at least one of a cooling fan, an air conditioning unit, a heating-ventilation and air conditioning (HVAC) unit, or a combination thereof.

6. The preconfigured weather-resistant enclosure assembly of claim 2, further comprising:
at least one 19-inch rack for mounting electronic equipment modules, including electronic equipment modules for converting power generated from the set of one or more solar panels to charge the renewable energy power management system.

7. The preconfigured weather-resistant enclosure assembly of claim 2, further comprising:
an electrical connection to an electric power grid; and
at least one electricity meter mechanically coupled to an outside wall of the preconfigured weather-resistant enclosure assembly to measure an amount of electrical energy consumed by electrical components inside the preconfigured weather-resistant enclosure assembly.

8. The preconfigured weather-resistant enclosure assembly of claim 2, wherein the renewable energy power management system further includes one or more outputs that provide at least one of 100VAC-120VAC power, 220VAC-240VAC, 24VDC-48VDC, or a combination thereof.

9. A method of constructing and installing a preconfigured weather-resistant enclosure assembly comprising:
installing, inside a weather-resistant enclosure, a backboard portion for mounting telecommunications equipment with at least one internal bus bar to provide an electrical ground;
fastening the weather-resistant enclosure on top of a concrete slab, wherein the concrete slab includes one or more electrical conduit openings aligned to provide a contiguous electrical conduit opening with one or more openings in a bottom portion of the weather-resistant enclosure;
assembling, inside the weather-resistant enclosure, a renewable energy power management system electrically coupled to an energy storage device, the renewable energy power management system that includes at least one of an AC output, a DC output, or a combination thereof, and the renewable energy power management system including one or more DC inputs for electrically coupling with one or more solar panels; and
assembling, outside the weather-resistant enclosure, the one or more solar panels electrically coupled to the renewable energy power management system;
transporting the preconfigured weather-resistant enclosure assembly to an installation site;
placing the preconfigured weather-resistant enclosure assembly on top of the ground at the installation site; and
supplying electric power from the one or more solar panels to the renewable energy power management system at the installation site.

10. The method of claim 9, wherein the supplying electric power to the renewable energy power management system includes supplying electric power to the renewable energy power management system for at least a year time period without connecting to an electrical power grid.

11. The method of claim 9, further comprising:
in response to adequate electric power being available from an electric power grid at the installation site, the renewable energy power management system switches from supplying electric power from the one or more solar panels to the renewable energy power management system to supplying electric power from the electric power grid to the renewable energy power management system; and
otherwise, the renewable energy power management system supplies electric power from the one or more solar panels to the renewable energy power management system.

12. The method of claim 9, wherein the fastening the weather-resistant enclosure on top of the concrete slab includes fastening the weather-resistant enclosure on a top side of the concrete slab and a bottom side of the concrete slab includes at least one set of parallel channels formed to accept a set of forklift forks to move the preconfigured weather-resistant enclosure assembly.

13. The method of claim 12, wherein the transporting the preconfigure weather-resistant enclosure assembly to an installation site includes using a forklift to place the preconfigure weather-resistant enclosure assembly onto a vehicle.

14. The method of claim 12, wherein the transporting the preconfigure weather-resistant enclosure assembly to an installation site includes using a forklift to place the preconfigure weather-resistant enclosure assembly onto the ground at the installation site.

15. The method of claim 9, wherein the assembling, outside the weather-resistant enclosure, one or more solar panels electrically coupled to the renewable energy power management system includes adjusting an angle of the one or more solar panels based on a geographic location of the installation site.

16. The method of claim 9, wherein the renewable energy power management system further includes one or more outputs that provide at least one of 100VAC-120VAC power, 220VAC-240VAC, 24VDC-48VDC, or a combination thereof.

17. The method of claim 9, wherein the constructing the preconfigured weather-resistant enclosure assembly further includes
    installing at least one of a cooling fan, an air conditioning unit, a heating-ventilation and air conditioning (HVAC) unit, or a combination thereof.

18. The preconfigured weather-resistant enclosure assembly of claim 1, wherein the one or more electrical conduit openings aligned to provide a contiguous electrical conduit opening with one or more openings in a bottom portion of the weather-resistant enclosure.

19. The preconfigured weather-resistant enclosure assembly of claim 1, wherein the weather-resistant enclosure includes at least one of a cooling fan, an air conditioning unit, a heating-ventilation and air conditioning (HVAC) unit, or a combination thereof.

20. The preconfigured weather-resistant enclosure assembly of claim 1, further comprising:
    an electrical connection to an electric power grid; and
    at least one electricity meter mechanically coupled to an outside wall of the preconfigured weather-resistant enclosure assembly to measure an amount of electrical energy consumed by electrical components inside the preconfigured weather-resistant enclosure assembly.

\* \* \* \* \*